(12) United States Patent
Yawata et al.

(10) Patent No.: US 11,909,034 B2
(45) Date of Patent: Feb. 20, 2024

(54) ALL-SOLID STATE SECONDARY BATTERY AND METHOD OF MANUFACTURING THE SAME

(71) Applicant: FUJIFILM Corporation, Tokyo (JP)

(72) Inventors: Toshihiko Yawata, Kanagawa (JP); Hiroaki Mochizuki, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 827 days.

(21) Appl. No.: 16/987,403

(22) Filed: Aug. 7, 2020

(65) Prior Publication Data

US 2020/0373565 A1 Nov. 26, 2020

Related U.S. Application Data

(63) Continuation of application No. PCT/JP2019/011142, filed on Mar. 18, 2019.

(30) Foreign Application Priority Data

Mar. 28, 2018 (JP) ................................. 2018-062756

(51) Int. Cl.
*H01M 4/36* (2006.01)
*H01M 10/0525* (2010.01)
(Continued)

(52) U.S. Cl.
CPC ....... *H01M 4/366* (2013.01); *H01M 10/0525* (2013.01); *H01M 10/0585* (2013.01);
(Continued)

(58) Field of Classification Search
CPC .............. C01B 25/00; H01M 10/0468; H01M 10/0481; H01M 10/0525; H01M 10/0562;
(Continued)

(56) References Cited

U.S. PATENT DOCUMENTS 8,579,994 B2   11/2013  Kawaoka et al.
2015/0171478 A1  6/2015  Suzuki et al.
(Continued)

FOREIGN PATENT DOCUMENTS

JP   2008103284   5/2008
JP   2010272266   12/2010
(Continued)

OTHER PUBLICATIONS

"International Search Report (Form PCT/ISA/210) of PCT/JP2019/011142," dated Jun. 18, 2019, with English translation thereof, pp. 1-4.
(Continued)

*Primary Examiner* — Victoria H Lynch
(74) *Attorney, Agent, or Firm* — JCIPRNET

(57) ABSTRACT

Provided is an all-solid state secondary battery comprising a laminate in which a positive electrode layer, a solid electrolyte layer, and a negative electrode layer are laminated in this order,
in which respective areas of the positive electrode layer, the solid electrolyte layer, and the negative electrode layer satisfy [the area of the positive electrode layer]< [the area of the negative electrode layer]≤[the area of the solid electrolyte layer],
a buffer layer having an area more than the area of the solid electrolyte layer and having a Young's modulus lower than that of each of, the positive electrode layer, the solid electrolyte layer, and the negative electrode layer is provided on either or both of a side of the positive electrode layer opposite to the solid electrolyte layer side and a side of the negative electrode layer opposite to the solid electrolyte layer side, and
the laminate is in a pressurized state through the buffer layer.

9 Claims, 2 Drawing Sheets

(51) Int. Cl.
    *H01M 10/0585* (2010.01)
    *H01M 50/474* (2021.01)
    *H01M 4/02* (2006.01)

(52) U.S. Cl.
    CPC .... *H01M 50/474* (2021.01); *H01M 2004/021* (2013.01); *H01M 2004/027* (2013.01); *H01M 2004/028* (2013.01); *H01M 2300/0068* (2013.01)

(58) Field of Classification Search
    CPC ....... H01M 10/0585; H01M 2004/021; H01M 2004/027; H01M 2004/028; H01M 2220/20; H01M 2220/30; H01M 2300/0068; H01M 4/366; H01M 50/474; Y02E 60/10; Y02P 70/50
    See application file for complete search history.

(56) References Cited

U.S. PATENT DOCUMENTS

2016/0248120 A1  8/2016  Yamada et al.
2017/0040644 A1  2/2017  Lupart et al.
2018/0294510 A1* 10/2018  Kitaura ............... H01M 10/647

FOREIGN PATENT DOCUMENTS

| JP | 2012142228 | 7/2012 |
| JP | 5131283 | 1/2013 |
| JP | 2013243004 | 12/2013 |
| JP | 2014035888 | 2/2014 |
| JP | 2014120199 | 6/2014 |
| JP | 2014120372 | 6/2014 |
| JP | 2014127272 | 7/2014 |
| WO | 2012141231 | 10/2012 |

OTHER PUBLICATIONS

"Written Opinion of the International Searching Authority (Form PCT/ISA/237) of PCT/JP2019/011142," dated Jun. 18, 2019, with English translation thereof, pp. 1-7.
"Search Report of Europe Counterpart Application", dated Apr. 16, 2021, pp. 1-11.
"Office Action of Korea Counterpart Application" with English translation thereof, dated Feb. 4, 2022, p. 1-p. 11.
"Office Action of China Counterpart Application" with English translation thereof, dated Feb. 24, 2023, p. 1-p. 19.
"Office Action of China Counterpart Application", dated Aug. 25, 2023, with English translation thereof, p. 1-p. 18.

* cited by examiner

ALL-SOLID STATE SECONDARY BATTERY AND METHOD OF MANUFACTURING THE SAME

CROSS-REFERENCE TO RELATED APPLICATIONS

This application is a Continuation of PCT International Application No. PCT/JP2019/011142 filed on Mar. 18, 2019, which claims priority under 35 U.S.C. § 119 (a) to Japanese Patent Application No. 2018-062756 filed in Japan on Mar. 28, 2018. Each of the above applications is hereby expressly incorporated by reference, in its entirety, into the present application.

BACKGROUND OF THE INVENTION

1. Field of the Invention

The present invention relates to an all-solid state secondary battery and a method of manufacturing the same.

2. Description of the Related Art

A lithium ion secondary battery is a storage battery including a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short-circuit and ignition may be caused in batteries due to overcharging or overdischarging, and there is a demand for additional improvement in safety and reliability.

Under these circumstances, the development of all-solid state secondary batteries in which an inorganic solid electrolyte is used instead of the organic electrolytic solution has progressed. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives. Further, an all-solid state secondary battery may have a laminate structure in which electrodes and an electrolyte are directly disposed in series. Therefore, the energy density can be further increased as compared to a secondary battery in which an organic electrolytic solution is used, and the application to an electric vehicle or a large-sized storage battery is expected.

In an all-solid state secondary battery, in a case where ion conduction between active materials of a positive electrode and a negative electrode occurs, expansion and contraction of the active materials occur. In order to suppress influence of the expansion and contraction on battery performance, the all-solid state secondary battery is in a constant pressurized state. By controlling the pressurized state, a technique of improving battery performance is reported. For example, JP2008-103284A describes an all-solid state secondary battery in which a support plate that includes a through hole at a plurality of positions including a center portion is provided on a side of each of a positive electrode and a negative electrode where the support plate does not face a solid electrolyte layer and the support plates are connected and tightened through the through holes such that a pressure of 1.5 to 200 MPa is applied to elements of the all-solid state secondary battery. As a result, battery characteristics can be maintained even after repeated charging and discharging.

SUMMARY OF THE INVENTION

For an all-solid state secondary battery, characteristics (cycle characteristics) capable of maintaining a constant discharge capacity even after repeated charging and discharging are required. In addition, characteristics (discharge load characteristics) capable of realizing a desired discharge capacity at a low resistance even in a case where discharging is performed at a high current value are required. Conversely, characteristics (high-speed charging characteristics) capable of realizing a sufficient charge capacity even in a case where high-speed charging is performed at a high current value.

However, from these viewpoints, the present inventors conducted an investigation on the technique described in JP2008-103284A and a laminate configuration of an all-solid state secondary battery in the related art and found that it is difficult to obtain an all-solid state secondary battery that sufficiently satisfies all the characteristics in a case where a positive electrode layer, a solid electrolyte layer, and a negative electrode layer are laminated and the obtained laminate is in a specific pressurized state.

Therefore, an object of the present invention is to provide an all-solid state secondary battery having excellent cycle characteristics, discharge load characteristics, and high-speed charging characteristics and a method of manufacturing the same.

The present inventors repeatedly conducted a thorough investigation in consideration of the above-described objects. As a result, in a laminate including a positive electrode layer, a solid electrolyte layer, and a negative electrode layer forming an all-solid state secondary battery, the above-described object can be solved by setting respective areas of the positive electrode layer, the solid electrolyte layer, and the negative electrode layer such that [the area of the positive electrode layer]<[the area of the negative electrode layer]≤[the area of the solid electrolyte layer] is satisfied, disposing a buffer layer having an area more than the area of the solid electrolyte layer and having a Young's modulus lower than that of each of the positive electrode layer, the solid electrolyte layer, and the negative electrode layer on either or both of a side of the positive electrode layer opposite to the solid electrolyte layer side and a side of the negative electrode layer opposite to the solid electrolyte layer side, and pressurizing the above-described laminate through the buffer layer. The present invention has been completed based on the above findings as a result of repeated investigation.

That is, the above-described objects have been achieved by the following means.

[1] An all-solid state secondary battery comprising a laminate in which a positive electrode layer, a solid electrolyte layer, and a negative electrode layer are laminated in this order, in which respective areas of the positive electrode layer, the solid electrolyte layer, and the negative electrode layer satisfy [the area of the positive electrode layer]< [the area of the negative electrode layer]≤[the area of the solid electrolyte layer], a buffer layer having an area more than the area of the solid electrolyte layer and having a Young's modulus lower than that of each of, the positive electrode layer, the solid electrolyte layer, and the negative electrode layer is provided on either or both of a side of the positive electrode layer opposite to the solid electrolyte layer side and a side of the negative electrode layer opposite to the solid electrolyte layer side, and the laminate is in a pressurized state through the buffer layer.

[2] The all-solid state secondary battery according to [1], in which a nonconductor layer is provided on an outer peripheral portion of the positive electrode layer, a total area of the positive electrode layer and the nonconductor layer is more than or equal to the area of the negative electrode layer, and the buffer layer has a Young's modulus lower than that of the nonconductor layer.

[3] The all-solid state secondary battery according to [2], in which respective thicknesses of the nonconductor layer, the positive electrode layer, and the buffer layer satisfy [the thickness of the nonconductor layer]≤[the thickness of the positive electrode layer]≤[the thickness of the buffer layer].

[4] The all-solid state secondary battery according to any one of [1] to [3], in which the area of the positive electrode layer is 4 cm$^2$ or more.

[5] The all-solid state secondary battery according to any one of [1] to [4], in which the thickness of the buffer layer is more than a total thickness of the positive electrode layer, the solid electrolyte layer, and the negative electrode layer.

[6] The all-solid state secondary battery according to any one of [1] to [5], further comprising:

a pressurizing plate that is provided on a side of the buffer layer opposite to the laminate side.

[7] The all-solid state secondary battery according to any one of [1] to [6], in which at least one of the positive electrode layer, the solid electrolyte layer, or the negative electrode layer includes an organic polymer compound.

[8] The all-solid state secondary battery according to any one of [1] to [7], in which a solid electrolyte is a sulfide-based solid electrolyte.

[9] The all-solid state secondary battery according to any one of [1] to [8], in which the Young's modulus of the buffer layer is 0.01 GPa or higher and lower than 2 GPa.

[10] The all-solid state secondary battery according to any one of [1] to [9], in which a pressure in the pressurized state is 0.1 MPa to 60 MPa.

[11] A method of manufacturing an all-solid state secondary battery including a laminate in which a positive electrode layer, a solid electrolyte layer, and a negative electrode layer are laminated in this order, the method comprising:

setting respective areas of the positive electrode layer, the solid electrolyte layer, and the negative electrode layer such that [the area of the positive electrode layer]<[the area of the negative electrode layer]≤[the area of the solid electrolyte layer] is satisfied;

disposing a buffer layer having an area more than the area of the solid electrolyte layer and having a Young's modulus lower than that of each of the positive electrode layer, the solid electrolyte layer, and the negative electrode layer on either or both of a side of the positive electrode layer opposite to the solid electrolyte layer side and a side of the negative electrode layer opposite to the solid electrolyte layer side; and pressurizing the laminate through the buffer layer.

In the all-solid state secondary battery according to an aspect of the present invention, cycle characteristics, discharge load characteristics, and high-speed charging characteristics are excellent. In addition, in the method of manufacturing an all-solid state secondary battery according to an aspect of the present invention, an all-solid state secondary battery having excellent cycle characteristics, discharge load characteristics, and high-speed charging characteristics can be obtained.

DESCRIPTION OF THE PREFERRED EMBODIMENTS

In the description of the present invention, numerical ranges represented by "to" include numerical values before and after "to" as lower limit values and upper limit values.

A preferred embodiment of an all-solid state secondary battery according to the present invention will be described below.

The all-solid state secondary battery according to the embodiment of the present invention comprises a laminate in which a positive electrode layer, a solid electrolyte layer, and a negative electrode layer are laminated in this order.

Figure 1:
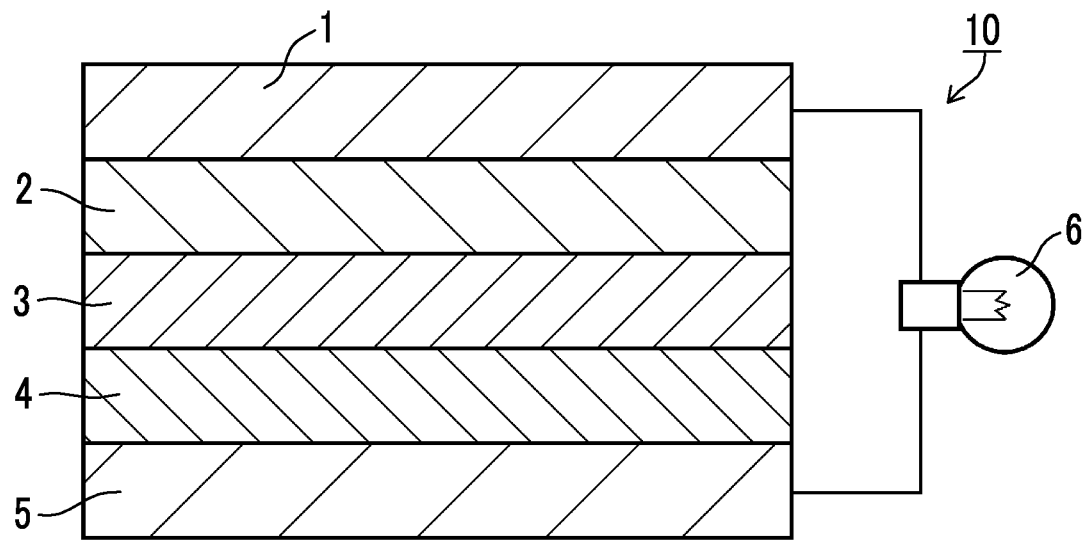
FIG. 1 is a vertical cross-sectional view schematically showing a structure of a laminate forming a general all-solid state secondary battery.

FIG. 1 is a cross-sectional view schematically showing a structure of a laminate 10 in which a positive electrode layer, a solid electrolyte layer, and a negative electrode layer are laminated in this order in a general all-solid state secondary battery including a working electrode in a case where the all-solid state secondary battery operates as a battery. In case of being seen from the negative electrode side, the laminate 10 includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. With the above-described structure, for example, in a lithium ion secondary battery, during charging, electrons (e$^-$) are supplied to the negative electrode side, and lithium ions (Li$^+$) are accumulated in the negative electrode side. On the other hand, during discharging, the lithium ions (Li$^+$) accumulated in the negative electrode side return to the positive electrode, and electrons are supplied to an operation portion 6. In an example illustrated in the drawing, an electric bulb is employed as the operation portion 6 and is lit by discharging.

In the description of the present invention, the negative electrode current collector 1 and the negative electrode active material layer 2 will be collectively referred to as "negative electrode layer", and the positive electrode active material layer 4 and the positive electrode current collector 5 will be collectively referred to as "positive electrode layer".

Here, in the present invention, the negative electrode active material layer is not necessarily provided in the negative electrode layer, and the negative electrode current collector can also be used as the negative electrode layer. This configuration is also preferable as the all-solid state secondary battery according to an embodiment of the present invention.

The configuration shown in each of the drawings is schematically shown for easy understanding of the present invention. The sizes of the respective members or a magnitude relationship therebetween may be changed for convenience of description, and an actual relationship is not shown as it is. In addition, external shapes or shapes other than those defined by the present invention are not limited to those shown in the drawing.

In the all-solid state secondary battery according to the embodiment of the present invention, respective areas of the positive electrode layer, the solid electrolyte layer, and the negative electrode layer satisfy [the area of the positive electrode layer]<[the area of the negative electrode layer]≤ [the area of the solid electrolyte layer]. A buffer layer having an area more than the area of the solid electrolyte layer and having a Young's modulus lower than that of each of the positive electrode layer, the solid electrolyte layer, and the negative electrode layer is provided on either or both of a side of the positive electrode layer opposite to the solid electrolyte layer side and a side of the negative electrode layer opposite to the solid electrolyte layer side.

Figure 2:
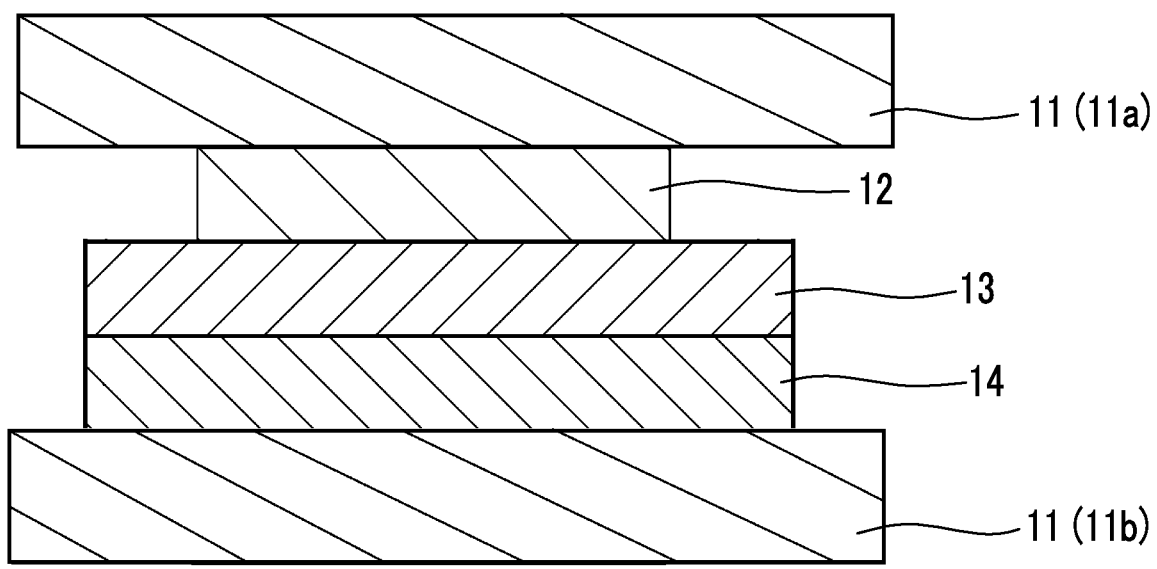
FIG. 2 is a vertical cross-sectional view schematically showing a preferred embodiment of the all-solid state secondary battery according to the present invention.
Figure 3:
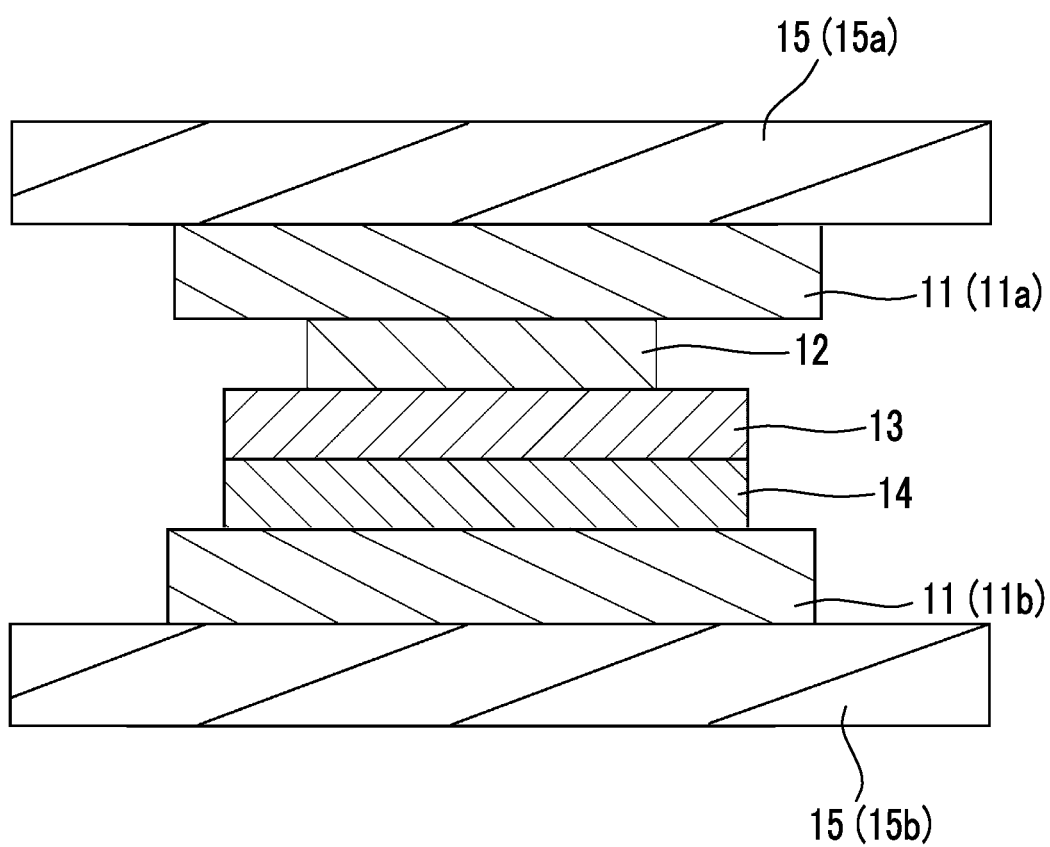
FIG. 3 is a vertical cross-sectional view schematically showing another preferred embodiment of the all-solid state secondary battery according to the present invention.

"Area" of each layer or member in the laminate structure forming the all-solid state secondary battery according to the embodiment of the present invention refers to a projected area in a laminating direction (in FIGS. 2 and 3, the area of each layer or member in a case where the laminate structure is seen from the top).

In addition, the Young's modulus in the present invention can be obtained using an evaluation of tensile properties defined by JIS-K 7161-1 and JIS Z 2241. Specifically, the Young's modulus can be determined based on [Amount of Change in Tensile Stress]/[Amount of Change in Tensile Strain] in a tensile test.

Tensile Stress=Tensile Load/Cross-Sectional Area of Specimen

Tensile strain=100×Amount of Change in Gauge Length/Gauge Length

A preferred configuration of the laminate in the all-solid state secondary battery according to the embodiment of the present invention is shown in FIG. 2. FIG. 2 shows a configuration in which [an area of a positive electrode layer 12]<[an area of a negative electrode layer 14]=[an area of a solid electrolyte layer 13] is satisfied, and buffer layers 11a and 11b having an area more than the area of the solid electrolyte layer 13 and having a Young's modulus lower than that of each of the positive electrode layer 12, the solid electrolyte layer 13, and the negative electrode layer 14 are provided on either or both of a side of the positive electrode layer 12 opposite to the solid electrolyte layer 13 side and a side of the negative electrode layer 14 opposite to the solid electrolyte layer 13 side.

In the present invention, the laminate consisting of the positive electrode layer 12, the solid electrolyte layer 13, and the negative electrode layer 14 is in a pressurized state through the buffer layer 11. A method of obtaining this pressurized state is not particularly limited. For example, a laminate consisting of the buffer layer 11a, the positive electrode layer 12, the solid electrolyte layer 13, the negative electrode layer 14, and the buffer layer 11b in order from the outside of the buffer layer 11 is vacuum-packed using a film such as a laminate such that the laminate can be made to enter a pressurized state through the buffer layer 11. In this case, the laminate structure in the vacuum package is in a reduced pressure. Therefore, this laminate is pressurized at a difference between the pressure in the reduced pressure state and the atmospheric pressure. In addition, for example, the structure shown in FIG. 2 is put into a coin case and the coin case is swaged such that a uniform pressure is applied to the buffer layer. As a result, the pressurized state through the buffer layer 11 can also be generated.

FIG. 2 shows the configuration in which the laminate is sandwiched between the buffer layers 11a and 11b, but the present invention is not limited to this configuration. For example, a configuration including the buffer layer 11a without including the buffer layer 11b can also be included in the all-solid state secondary battery according to the embodiment of the present invention. It is more preferable that the all-solid state secondary battery according to the embodiment of the present invention includes both the buffer layers 11a and 11 b.

In addition, as shown in FIG. 3, the laminate can also be pressurized by disposing a pressurizing plate 15 (15a, 15b) on a side above or below the buffer layer 11 (side of the buffer layer 11 opposite to the solid electrolyte layer side) and pressing the pressurizing plate toward the buffer layer side. A pressurization method using the pressurizing plate is not particularly limited. For example, in a configuration of FIG. 3, the laminate can be pressurized by providing a through hole in the upper and lower pressurizing plates 15a and 15b and connecting and tightening the pressurizing plates 15a and 15b using this through hole. In addition, the pressurized state through the buffer layer 11 can also be generated by putting the structure shown in FIG. 3 into a coin case and, for example, swaging the coin case to apply pressure to the pressurizing plate.

FIG. 3 shows a configuration in which the laminate is sandwiched between the pressurizing plates 15a and 15b through the buffer layer, but the present invention is not limited to this configuration. For example, in a configuration in which the all-solid state secondary battery according to the embodiment of the present invention includes a pressurizing plate, the all-solid state secondary battery may include any one of the pressurizing plate 15a or 15b.

The Young's modulus of the pressurizing plate is typically 2 GPa or higher and preferably 2 to 300 GPa and more preferably 2 to 250 GPa. In addition, the Young's modulus of the pressurizing plate is also preferably 5 to 250 GPa, 10 to 250 GPa, is also preferably 30 to 250 GPa, or 50 to 250 GPa. Specific examples of the pressurizing plate include a stainless steel plate, an acrylic plate, an aluminum plate, a brass plate, a polycarbonate plate, a nickel plate, a zinc plate, and a titanium plate.

It is preferable that the area of the pressurizing plate is more than the area of the solid electrolyte layer. In addition, in a case where the pressurizing plate is provided in contact with the buffer layer, it is preferable that the area of the pressurizing plate is more than the area of the buffer layer.

The area of the pressurizing plate is preferably 2 to 1000 $cm^2$ and more preferably 4 to 200 $cm^2$.

In addition, the thickness of the pressurizing plate is not particularly limited and can be appropriately set such that the entire buffer layer can be substantially uniformly pressurized. For example, the thickness of the pressurizing plate can be set to 0.1 to 50 mm, may be 0.5 to 30 mm, 1 to 20 mm, or 2 to 15 mm.

In the all-solid state secondary battery according to the embodiment of the present invention, the pressure in the pressurized state (the difference from the atmospheric pressure) is preferably 0.1 to 60 MPa and more preferably 1 to 50 MPa. In a case where the laminate is pressurized by vacuum packing, the pressure is the difference between the pressure in the vacuum package and the atmospheric pressure.

As described above, the all-solid state secondary battery according to the embodiment of the present invention satisfies [the area of the positive electrode layer]<[the area of the negative electrode layer]≤[the area of the solid electrolyte layer]. That is, [the area of the positive electrode layer]<[the area of the solid electrolyte layer] is satisfied, [the area of the positive electrode layer]<[the area of the negative electrode layer] is satisfied, and Further, [the area of the negative electrode layer]≤[the area of the solid electrolyte layer] is satisfied.

The all-solid state secondary battery according to the embodiment of the present invention satisfies [the area of the positive electrode layer]<[the area of the solid electrolyte layer] such that short-circuit can be effectively prevented even in the pressurized state. The reason for this is presumed that, even in a case where the pressurized positive electrode layer is pressed and expands in a direction perpendicular to the laminating direction, the expanded portion can be made to remain on the solid electrolyte layer. [The area of the positive electrode layer]/[the area of the solid electrolyte layer] is preferably 1/1.01 to 1/1.8, more preferably 1/1.01 to 1/1.6, and still more preferably 1/1.05 to 1/1.4. In addition, [the area of the positive electrode layer]/[the area of the solid electrolyte layer] is also preferably 1/1.05 to 1/1.6, 1/1.1 to 1/1.6, or 1/1.15 to 1/1.6.

The projected shape of the positive electrode layer in the laminating direction is within a range of the projected shape of the solid electrolyte layer in the laminating direction.

In addition, the all-solid state secondary battery according to the embodiment of the present invention satisfies [the area of the positive electrode layer]<[the area of the negative electrode layer] such that high-speed charging characteristics can be effectively improved. Although the reason is not clear, in a case where [the area of the positive electrode layer]<[the area of the negative electrode layer] is satisfied, Li ions produced from the positive electrode layer during charging can be spread to the entire negative electrode layer having an area more than that of the positive electrode layer. Therefore, even during high-speed charging, concentrated localization of Li ions on the negative electrode layer is not likely to occur. This is one reason for the above-described effect.

[The area of the positive electrode layer]/[the area of the negative electrode layer] is preferably 1/1.01 to 1/1.8, more preferably 1/1.01 to 1/1.6, and still more preferably 1/1.05 to 1/1.4. In addition, [the area of the positive electrode layer]/[the area of the negative electrode layer] is also preferably 1/1.05 to 1/1.6, 1/1.1 to 1/1.6, or 1/1.15 to 1/1.6.

The projected shape of the positive electrode layer in the laminating direction is within a range of the projected shape of the negative electrode layer in the laminating direction.

In addition, the all-solid state secondary battery according to the embodiment of the present invention satisfies [the area of the negative electrode layer]<[the area of the solid electrolyte layer] such that short-circuit can be effectively prevented even in the pressurized state.

[The area of the negative electrode layer]/[the area of the solid electrolyte layer] is preferably 0.8/1 to 1/1 and more preferably 0.9/1 to 1/1.

The projected shape of the negative electrode layer in the laminating direction is the same as or within a range of the projected shape of the solid electrolyte layer in the laminating direction.

The all-solid state secondary battery according to the embodiment of the present invention is in the pressurized state through the buffer layer 11 having a Young's modulus lower than that of each of the positive electrode layer 12, the solid electrolyte layer 13, and the negative electrode layer 14. Here, the value of the Young's modulus of the positive electrode layer 12 is a higher value among the values of the positive electrode current collector and the positive electrode active material layer. In addition, in a case where the negative electrode layer 14 consists of the negative electrode current collector and the negative electrode active material layer, the Young's modulus of the negative electrode layer 14 is also a higher value among the values of the negative electrode current collector and the negative electrode active material layer.

In the all-solid state secondary battery according to the embodiment of the present invention, the areas and the Young's moduli of the positive electrode layer, the solid electrolyte layer, the negative electrode layer, and the buffer layer satisfy the regulations of the present invention, and the laminate consisting of the positive electrode layer, the solid electrolyte layer, and the negative electrode layer is in the pressurized state through the buffer layer. As a result, for example, in the configurations shown in FIGS. 2 and 3, the Young's modulus of the buffer layer 11 is low. Therefore, the buffer layer 11 can be substantially uniformly pressed against an outer portion of the solid electrolyte layer 13 further than the outer periphery of the positive electrode layer (a portion of the solid electrolyte layer 13 where the positive electrode layer is not provided). Thus, it is presumed that a uniform pressure can be applied to the entire laminate consisting of the positive electrode layer, the solid electrolyte layer, and the negative electrode layer without pressure concentration, and battery performance can be effectively improved.

The Young's modulus of the buffer layer 11 is preferably 0.01 GPa or higher and lower than 2 GPa, more preferably 0.02 GPa or higher and lower than 1.6 GPa, and still more preferably 0.02 GPa or higher and lower than 1.4 GPa. It is preferable that the buffer layer 11 has a single-layer structure. In addition, in a case where the buffer layer 11 has a multi-layer structure, it is preferable that the respective layers are formed of the same material.

The constituent material forming the buffer layer 11 is not particularly limited as long as it satisfies the regulations of the present invention. Specific preferable examples of the material include silicon rubber, cellulose fiber, paper, a polyolefin resin, a polyurethane resin, an acrylic resin, a polyimide resin, and wood.

In the all-solid state secondary battery according to the embodiment of the present invention, it is preferable that the thickness of the buffer layer is more than the total thickness of the positive electrode layer, the solid electrolyte layer, and the negative electrode layer. By satisfying the thickness relationship such that a uniform pressure is applied to a surface of the buffer layer opposite to the solid electrolyte layer side, the entire laminate satisfying [the area of the positive electrode layer]<[the area of the negative electrode layer]≤[the area of the solid electrolyte layer] can be more uniformly pressurized.

The thickness of the buffer layer is preferably 20 to 10000 μm more preferably 100 to 5000 μm, and still more preferably 500 to 5000 μm. The thickness of the buffer layer is in the preferable range, a desired pressure can be more reliably transferred from the buffer layer to the laminate.

In the all-solid state secondary battery according to the embodiment of the present invention, it is also preferable that a nonconductor layer is provided in an outer peripheral portion of the positive electrode layer. In the present invention, "nonconductor layer" refers to a layer having an electron conductivity of $10^{-5}$ S/cm or lower at a measurement temperature of 25° C. In the present invention, "electron conductivity" can be obtained from the following expression after applying a constant voltage (for example, 10 mV) from both surfaces of the nonconductor layer punched in a circular shape (for example, 1 cm$^2$) and measuring a current in a steady state.

Electron Conductivity=Thickness of Nonconductor Layer/[Area of Nonconductor Layer×(Current Value/0.01)]

The nonconductor layer buries a part or the entirety of a void between the buffer layer and the solid electrolyte layer in the outer periphery of the positive electrode layer, the void being generated by the thickness of the positive electrode layer. Accordingly, in a case where the laminate is in the pressurized state, the entire laminate can be made to enter a more uniform pressurized state.

Examples of a constituent material forming the nonconductor layer include a resin. Examples of the resin include a polystyrene resin, a polyolefin resin, an acrylonitrile/butadiene/styrene copolymer (ABS resin), a polyvinyl chloride (PVC) resin, a polyamide resin, a polyacetal resin, a polycarbonate resin, a polyethylene terephthalate resin, and a polytetrafluoroethylene resin (PTFE resin).

The total area of the positive electrode layer and the nonconductor layer is set to be more than the area of the negative electrode layer. As a result, short-circuit can be more reliably suppressed, and the entire laminate can be made to enter a more uniform pressurized state. In addition, the Young's modulus of the nonconductor layer is higher than that of the buffer layer. As a result, the nonconductor layer receives a pressure from the buffer layer, efficiently transfers the pressure to the solid electrolyte layer, and contributes to a more uniform pressurized state of the laminate.

It is preferable that the thickness of the nonconductor layer satisfies [the thickness of the nonconductor layer]≤[the thickness of the positive electrode layer]≤[the thickness of the buffer layer]. By satisfying the thickness relationship, the buffer layer can more reliably pressurize the entire laminate.

Specifically, the thickness of the nonconductor layer is preferably 5 to 100 µm and more preferably 10 to 60 µm.

A method of forming the nonconductor layer is not particularly limited. For example, the nonconductor layer can be formed by forming a hole at a portion corresponding to the positive electrode in a nonconductor substrate having a predetermined thickness and a predetermined area and then laminating the nonconductor substrate. In addition, the positive electrode active material layer can also be formed in the hole of the nonconductor layer in which the hole is formed in advance.

In the all-solid state secondary battery according to the embodiment of the present invention, the area of the positive electrode layer is not particularly limited. In order to more effectively exhibit the effect of uniform pressurization, it is preferable that the area of the laminate has a constant size. Specifically, the area of the positive electrode layer is preferably 4 cm$^2$ or more and more preferably 4 to 400 cm$^2$.

In addition, the area of the positive electrode layer may be 4 to 300 cm$^2$ or may be 4 to 180 cm$^2$.

In addition, in the all-solid state secondary battery according to the embodiment of the present invention, the area of the solid electrolyte layer is preferably more than 4 cm$^2$ and more preferably 4.1 to 600 cm$^2$. In addition, the area of the solid electrolyte layer may be 4.1 to 500 cm$^2$, 4.2 to 400 cm$^2$, 4.5 to 300 cm$^2$, or 5 to 200 cm$^2$.

In addition, in the all-solid state secondary battery according to the embodiment of the present invention, the area of the negative electrode layer is preferably more than 4 cm$^2$ and more preferably 4.1 to 600 cm$^2$. In addition, the area of the negative electrode layer may be 4.1 to 500 cm$^2$, 4.2 to 400 cm$^2$, 4.5 to 300 cm$^2$, or 5 to 200 cm$^2$.

In addition, in the all-solid state secondary battery according to the embodiment of the present invention, the area of the buffer layer is preferably more than 4 cm$^2$ and more preferably 4.1 to 1000 cm$^2$. In addition, the area of the buffer layer may be 5 to 800 cm$^2$. In the all-solid state secondary battery according to the embodiment of the present invention, the projected shape of the solid electrolyte layer in the laminating direction is within a range of the projected shape of the buffer layer in the laminating direction.

Accordingly, preferable configurations of the solid electrolyte layer, the positive electrode layer, and the negative electrode layer forming the all-solid state secondary battery according to the embodiment of the present invention will be described.

[Solid Electrolyte Layer]

The solid electrolyte layer forming the all-solid state secondary battery according to the embodiment of the present invention can be formed of a typical constituent material used for the respective layers in the all-solid state secondary battery. It is preferable that the solid electrolyte layer according to the embodiment of the present invention preferably includes an inorganic solid electrolyte having ion conductivity of a metal belonging to Group 1 or Group 2 in the periodic table, and optionally further includes a binder. The solid electrolyte layer forming the all-solid state secondary battery according to the embodiment of the present invention can be formed, for example, by applying a solid electrolyte composition including the inorganic solid electrolyte, the binder, and a dispersion medium and drying the solid electrolyte composition. The content of each of the components in the solid electrolyte composition can be appropriately adjusted according to the purpose.

<Inorganic Solid Electrolyte>

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers (LiPF$_6$, LiBF$_4$, LiFSI, LiCl, and the like). The inorganic solid electrolyte is not particularly limited as long as it has ion conductivity of a metal belonging to Group 1 or Group 2 in the periodic table and generally does not have electron conductivity.

In the present invention, the inorganic solid electrolyte has ion conductivity of a metal belonging to Group 1 or Group 2 in the periodic table. The inorganic solid electrolyte can be appropriately selected from solid electrolyte materials to be applied to this kind of products and used. Representative examples of the inorganic solid electrolyte include (i) a sulfide-based inorganic solid electrolyte and (ii) an oxide-based inorganic solid electrolyte. From the viewpoint of a high ion conductivity and easiness in joining interfaces between particles, a sulfide-based inorganic solid electrolyte is preferable.

In a case where an all-solid state secondary battery according to the embodiment of the present invention is an all-solid state lithium ion secondary battery, the inorganic solid electrolyte preferably has ion conductivity of lithium ions.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive sulfide-based inorganic solid electrolyte satisfying a composition represented by the following Formula (I).

$$L_{a1}M_{b1}P_{c1}S_{d1}A_{e1} \quad \text{Formula (I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$ $SiS_2$, $Li_2S$ $Al_2S_3$, $Li_2S$—$SiS_2$—$Al_2S_3$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

Specific examples of the compound include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}{}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0≤yf≤3, 1≤zf≤10), $Li_{xg}S_{yg}O_{zg}$ (1≤xg≤3, 0≤yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$) and LiPON in which some of oxygen atoms in lithium phosphate are substituted with nitrogen atoms, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al, C, Ga, or the like) and the like.

The inorganic solid electrolyte is preferably in the form of particles. In this case, the particle size of the inorganic solid electrolyte is not particularly limited. From the viewpoints of ion conductivity, workability, and interface formability, the particle size of the inorganic solid electrolyte is preferably 0.01 μm or more, more preferably 0.2 μm or more, and still more preferably 0.3 μm or more. In addition, the particle size of the inorganic solid electrolyte is preferably 100 μm or less, more preferably 50 μm or less, still more preferably 20 μm or less, still more preferably 4 μm or less, and still more preferably 2 μm or less.

The particle size of the inorganic solid electrolyte particles refers to the average particle size and can be determined as described below.

The inorganic solid electrolyte particles are diluted and prepared to 1 mass % of a dispersion liquid by using water (heptane in a case where the inorganic solid electrolyte is unstable in water) in a 20 mL sample bottle. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

<Binder>

The binder included in the solid electrolyte layer can be formed of various organic polymer compounds (polymers). The binder improves binding properties between inorganic solid electrolyte particles and contributes to improvement of mechanical strength, ion conductivity, and the like. The organic polymer compound forming the binder may include a particle polymer or a non-particle polymer.

First, the binder can be formed of, for example, an organic polymer compound described below.

(Fluorine-Containing Resin)

Examples of a fluorine-containing resin include polytetrafluoroethylene (PTFE), polyvinylene difluoride (PVdF), and a copolymer (PVdF-HFP) of polyvinylene difluoride and hexafluoropropylene.

(Hydrocarbon-Based Thermoplastic Resin)

Examples of a hydrocarbon-based thermoplastic resin include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

((Meth)Acrylic Resin)

Examples of a (meth)acrylic resin include various (meth) acrylic monomers, (meth)acrylamide monomers, and copolymers of two or more monomers thereof.

In addition, copolymers of vinyl monomers are also be suitably used. Examples of the copolymers include a copolymer of methyl (meth)acrylate and styrene, a copolymer of methyl (meth)acrylate and acrylonitrile, and a copolymer of butyl (meth)acrylate, acrylonitrile, and styrene. However, the copolymers are not limited to these examples. In the present specification, the copolymer may be any one of a statistic copolymer or a periodic copolymer and is preferably a random copolymer.

(Other Resins)

Examples of other resins include a polyurethane resin, a polyurea resin, a polyamide resin, a polyimide resin, a polyester resin, a polyether resin, a polycarbonate resin, and a cellulose derivative resin.

Among these, a fluorine-containing resin, a hydrocarbon-based thermoplastic resin, a (meth)acrylic resin, a polyurethane resin, a polycarbonate resin, or a cellulose derivative resin is preferable, and a (meth)acrylic resin or a polyurethane resin is more preferable from the viewpoint of high affinity to the inorganic solid electrolyte, high flexibility of the resin itself, and strong binding properties with the solid particles.

The above-described various resins are commercially available. In addition, the binder resin particles or the polymer forming the binder resin particles can also be prepared using an ordinary method.

From the viewpoint of improving binding properties between the solid particles, the number-average molecular weight of a polymer forming the first binder is preferably 1000 to 1000000 and more preferably 10000 to 500000.

The above-described organic polymer compound is merely exemplary, and the binder (B) according to the embodiment of the present invention is not limited to this configuration.

[Positive Electrode Active Material Layer and Negative Electrode Active Material Layer]

The positive electrode active material layer and the negative electrode active material layer forming the all-solid state secondary battery according to the embodiment of the present invention are laminated on the positive electrode current collector and the negative electrode current collector, respectively, to form the positive electrode layer and the negative electrode layer. The positive electrode active material layer and the negative electrode active material layer can be formed of typical constituent materials used in the all-solid state secondary battery. The positive electrode active material layer includes a positive electrode active material, and the negative electrode active material layer includes a negative electrode active material. It is preferable that the positive electrode active material layer and the negative electrode active material layer have the same configuration of the solid electrolyte layer, except that they include the active materials.

That is, each of the positive electrode active material layer and the negative electrode active material layer according to the embodiment of the present invention can be formed by adding the corresponding active material to the solid electrolyte composition to prepare a composition (a positive electrode-forming composition or a negative electrode-forming composition; these compositions will be collectively referred to as "electrode-forming composition"), applying the prepared composition to a substrate (for example, a current collector), and drying the applied composition. The content of each of the components in the electrode-forming composition can be appropriately adjusted according to the purpose.

<Active Material>

The shape of the active material is not particularly limited, but is preferably a particle shape. In addition, the particle size of the active material is not particularly limited as long as it satisfies the above-described particle size. From the viewpoint of improving dispersibility, improving the contact area between the solid particles, and reducing the interfacial reactivity, the particle size of the active material is preferably 0.1 μm or more, more preferably 1 μm or more, and still more preferably 2 μm or more. In addition, the particle size of the active material is preferably 20 μm or less, more preferably 10 μm or less, and still more preferably 5 μm or less. The particle size of the active material refers to an average particle size and can be determined using the same method as that of the particle size of the inorganic solid electrolyte. In a case where the particle size of the active material is less than or equal to a measurement limit of the particle size analyzer, the particle size is measured using a transmission electron microscope (TEM) after optionally drying and hardening the active material.

(Positive Electrode Active Material)

The positive electrode active material is preferably capable of reversibly intercalating and deintercalating lithium ions. The above-described material is not particularly limited as long as the material has the above-described characteristics and may be transition metal oxides, organic matter, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio Li/$M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

In order to allow the positive electrode active material to have a desired particle size, an ordinary pulverizer or classifier may be used. Positive electrode active materials obtained using a calcination method may be used after being washed with water, an acidic aqueous solution, an alkaline aqueous solution, or an organic solvent.

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass can be appropriately determined depending on the designed battery capacity.

(Negative Electrode Active Material)

The negative electrode active material is preferably capable of reversibly intercalating and deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, a carbonaceous material or a lithium composite oxide is preferably used from the viewpoint of reliability. In addition, the metal composite oxide is preferably capable of intercalating and deintercalating lithium. The material is not particularly limited, but preferably includes titanium and/or lithium as a component from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ in case of being measured by an X-ray diffraction method using CuKα rays, and the oxide may have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Si_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

In order to allow the negative electrode active material to have a predetermined particle size, an ordinary pulverizer or classifier may be used. For example, a mortar, a ball mill, a sand mill, a vibration ball mill, a satellite ball mill, a planetary ball mill, a swirling air flow jet mill, a sieve, or the like is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method.

The chemical formulae of the compounds obtained using a calcination method can be calculated using inductively coupled plasma (ICP) optical emission spectroscopy as a measurement method from the mass difference of powder before and after calcinating as a convenient method.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass can be appropriately determined depending on the designed battery capacity.

The surfaces of the positive electrode active material and the negative electrode active material may be coated with a separate metal oxide. In addition, the particle surfaces of the positive electrode active material or the negative electrode active material may be treated with an actinic ray or an active gas (plasma or the like) before or after the coating of the surfaces.

In addition, in the present invention, the positive electrode active material layer or the negative electrode active material layer may include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used.

In the all-solid state secondary battery according to the embodiment of the present invention, the thickness of each of the negative electrode active material layer, the solid electrolyte layer, and the positive electrode active material layer is not particularly limited. In consideration of the dimension of a general all-solid state secondary battery, the thickness of each of the layers is preferably 10 μm to 500 μm, more preferably 20 μm to 400 μm, and still more preferably 20 μm to 200 μm.

In the all-solid state secondary battery according to the embodiment of the present invention, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 μm.

[Current Collector]

A positive electrode current collector and a negative electrode current collector are preferably an electron conductor. As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited and is preferably 1 to 500 μm, more preferably 2 to 300 μm, and still more preferably 2 to 200 μm. In addition, it is also preferable that the surface of the current collector is made to be uneven through a surface treatment.

In the all-solid state secondary battery according to the embodiment of the present invention, the thickness of positive electrode layer or the negative electrode layer is preferably 20 to 1000 μm, more preferably 30 μm to 500 μm, and still more preferably 30 to 300 μm.

[Preparation of Laminate in all-Solid State Secondary Battery]

A preferable configuration of a method of forming the laminate (laminate consisting of the positive electrode layer, the solid electrolyte layer, and the negative electrode layer) forming the all-solid state secondary battery according to the embodiment of the present invention will be described below.

In the laminate, the area of the positive electrode layer is less than that of the solid electrolyte layer. Therefore, typically, the solid electrolyte composition having a uniform thickness is not applied to the positive electrode layer to form the solid electrolyte layer. For example, in order to form the laminate satisfying [the area of the positive electrode layer]<[the area of the negative electrode layer]=[the area of the solid electrolyte layer], the positive electrode-forming composition is applied to the positive electrode current collector to form a coating film, and this coating film is dried to prepare a positive electrode sheet consisting of the current collector and the positive electrode active material layer. A sheet that is separately prepared and includes the negative electrode current collector, the negative electrode active material layer, and the solid electrolyte layer in this order and the positive electrode sheet are bonded to each other such that the positive electrode active material layer and the solid electrolyte layer are in contact with each other. As a result, a desired laminate can be obtained.

In addition, the laminate that satisfying [the area of the positive electrode layer]<[the area of the negative electrode layer]<[the area of the solid electrolyte layer] can be obtained, for example, by sandwiching the solid electrolyte layer between the positive electrode and the negative electrode that are cut in predetermined sizes, the solid electrolyte layer being obtained by forming the solid electrolyte layer on the substrate and cutting the solid electrolyte layer in a predetermined size or by pressing powder of a solid electrolyte into a mold having a desired size and stamping the powder.

An application method for forming a film of each of the compositions is not particularly limited and can be appropriately selected. Examples of the application method include coating (preferably wet-type coating), spray coating, spin coating, dipcoat coating, slit coating, stripe coating, and bar coating. In addition, the drying temperature of the coating film is not particularly limited and is preferably 30° C. or higher, more preferably 60° C. or higher, and still more preferably 80° C. or higher. In addition, the drying temperature is preferably 300° C. or lower, more preferably 250° C. or lower, and still more preferably 200° C. or lower.

[Manufacturing of all-Solid State Secondary Battery]

The all-solid state secondary battery according to the embodiment of the present invention can be obtained using a method including: disposing the above-described buffer layer having an area more than the area of the solid electrolyte layer and having a Young's modulus lower than that of each of the positive electrode layer, the solid electrolyte layer, and the negative electrode layer on either or both of a side of the positive electrode layer opposite to the solid electrolyte layer side and a side of the negative electrode layer opposite to the solid electrolyte layer side in the above-described laminate; and pressurizing the above-described laminate through the buffer layer.

The configuration of the pressurization through the buffer layer is as described above.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric vehicles and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with solar batteries.

EXAMPLES

The present invention will be described in more detail based on Examples but is not limited to these examples.

[Synthesis of Sulfide-Based Inorganic Solid Electrolyte Li—P—S-Based Glass (A-1)]

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphorus pentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li—P—S-based glass; hereinafter, referred to as Li—P—S) was obtained. The ion conductivity of the obtained Li—P—S-based glass (A-1) was $0.8 \times 10^{-3}$ S/cm.

[Synthesis of Sulfide-Based Inorganic Solid Electrolyte Li—P—S-Based Glass (A-2)]

In a glove box under an argon atmosphere (dew point: −70° C.), 1.54 g of lithium sulfide ($Li_2S$, manufactured by Aldrich-Sigma, Co. LLC. Purity: >99.98%), 1.47 g of diphosphorus pentasulfide ($P_2S_5$, manufactured by Aldrich-Sigma, Co. LLC. Purity: >99%), and 0.91 g of germanium disulfide ($GeS_2$, manufactured by Kojundo Chemical Laboratory Co., Ltd.) were respectively weighed, put into an agate mortar, and mixed using an agate muddler for five minutes. $Li_2S$, $P_2S_5$, and $GeS_2$ were mixed such that a molar ratio Li:P:S:Ge was 10:2:12:1.

66 g of zirconia beads having a diameter of 5 mm were put into a 45 mL zirconia container (manufactured by Fritsch Japan Co., Ltd.), the total amount of the mixture including $Li_2S$, $P_2S_5$, and $GeS_2$ was put thereinto, and the container was sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours.

The obtained material was put into a quartz tube and vacuum-packed, and this quartz tube was calcinated in a calcination furnace at 550° C. for 6 hours. The material was cooled to room temperature, and a Li—P—S-based glass (A-2) was obtained. The ion conductivity of the obtained Li—P—S-based glass (A-2) was $4.0 \times 10^{-3}$ S/cm.

[Preparation of Solid Electrolyte Composition]

<Preparation of Solid Electrolyte Composition (S-1)>

180 zirconia beads having a diameter of 5 mm were put into a 45 mL zirconia container (manufactured by Fritsch Japan Co., Ltd.), and 9.7 g of the Li—P—S-based glass (A-1) synthesized as described above, 0.3 g of PVdF-HFP (copolymer of vinylidene fluoride and hexafluoropropylene; manufactured by Arkema K.K.) as a binder, and 15 g of a heptane/tetrahydrofuran mixed solvent as a dispersion medium were put thereinto. Next, the container was set in a planetary ball mill P-7 (trade name, manufactured by Fritsch Japan Co., Ltd.), and the components were continuously stirred for 2 hours at a temperature of 25° C. and a rotation speed of 300 rpm. This way, a solid electrolyte composition (S-1) was prepared.

<Preparation of Solid Electrolyte Composition (S-2)>

180 zirconia beads having a diameter of 5 mm were put into a 45 mL zirconia container (manufactured by Fritsch Japan Co., Ltd.), and 9.6 g of the Li—P—S-based solid electrolyte (A-2) synthesized as described above, 0.3 g of HSBR (hydrogenated styrene butadiene rubber; manufactured by JSR Corporation) as a binder, 0.1 g of ethyl cellulose, and 15 g of a heptane/tetrahydrofuran mixed solvent as a dispersion medium were put thereinto. Next, the container was set in a planetary ball mill P-7 (trade name, manufactured by Fritsch Japan Co., Ltd.), and the components were continuously stirred for 2 hours at a temperature of 25° C. and a rotation speed of 300 rpm. This way, a solid electrolyte composition (S-2) was prepared.

[Preparation of Positive Electrode Composition]

<Preparation of Positive Electrode Composition AS-1>

50 zirconia beads having a diameter of 3 mm were put into a 45 mL zirconia container (manufactured by Fritsch Japan Co., Ltd.), and 0.91 g of the solid electrolyte composition S-1 prepared as described above was added thereto. 4.00 g of a positive electrode active material NMC (111) and 0.09 g of a conductive auxiliary agent A (acetylene black) were added to the container. Next, the container was set in a planetary ball mill P-7 (manufactured by Fritsch Japan Co., Ltd.) and the components were continuously stirred for 15 minutes at a temperature of 25° C. and a rotation speed of 100 rpm. As a result, a positive electrode composition AS-1 was prepared.

<Preparation of Positive Electrode Composition AS-2>

50 zirconia beads having a diameter of 3 mm were put into a 45 mL zirconia container (manufactured by Fritsch Japan Co., Ltd.), and 0.91 g of the solid electrolyte composition S-2 prepared as described above was added thereto. 4.00 g of a positive electrode active material NMC (111) and 0.09 g of a conductive auxiliary agent A (acetylene black) were added to the container. Next, the container was set in a planetary ball mill P-7 (manufactured by Fritsch Japan Co., Ltd.) and the components were continuously stirred for 15 minutes at a temperature of 25° C. and a rotation speed of 100 rpm. As a result, a positive electrode composition AS-2 was prepared.

[Preparation of Negative Electrode Composition]

<Preparation of Negative Electrode Composition (BS-1)>50 zirconia beads having a diameter of 3 mm were put into a 45 mL zirconia container (manufactured by Fritsch Japan Co., Ltd.), and 2.1 g of the solid electrolyte composition S-1 prepared as described above was added thereto. 3 g of graphite as a negative electrode active material was added. Next, the container was set in a planetary ball mill P-7 (manufactured by Fritsch Japan Co., Ltd.) and the components were continuously stirred for 15 minutes at a temperature of 25° C. and a rotation speed of 100 rpm. As a result, a negative electrode composition BS-1 was prepared.

<Preparation of Negative Electrode Composition (BS-2)>

50 zirconia beads having a diameter of 3 mm were put into a 45 mL zirconia container (manufactured by Fritsch Japan Co., Ltd.), and 2.1 g of the solid electrolyte composition S-2 prepared as described above was added thereto. 3 g of graphite as a negative electrode active material was added. Next, the container was set in a planetary ball mill P-7 (manufactured by Fritsch Japan Co., Ltd.) and the components were continuously stirred for 15 minutes at a temperature of 25° C. and a rotation speed of 100 rpm. As a result, a negative electrode composition BS-2 was prepared.

[Preparation of Positive Electrode Sheet for all-Solid State Secondary Battery]

The positive electrode composition AS-1 prepared as described above was applied to an aluminum foil (current collector) having a thickness of 20 μm using an applicator (trade name: SA-201 Baker Type applicator, manufactured by Tester Sangyo Co., Ltd.). The composition was heated at 80° C. for 1 hour and further heated at 110° C. for 1 hour to dry the positive electrode composition. Next, the laminate was pressurized (180 MPa, 1 minute) while being heated (120° C.) using a heat press machine. As a result, a positive electrode sheet for an all-solid state secondary battery having a laminate structure of positive electrode active material layer/aluminum foil was prepared. The thickness of the positive electrode active material layer was 60 μm. The mass of the positive electrode active material layer was 22 mg per 1 cm² (excluding the aluminum foil).

This positive electrode sheet was punched in a circular shape having a diameter of 9 mm. As a result, a positive electrode sheet was prepared (area: 0.6 cm²).

[Preparation of Negative electrode for All-Solid State Secondary Battery-Solid Electrolyte Sheet]

The negative electrode composition BS-1 prepared as described above was applied to a stainless steel (SUS) foil having a thickness of 20 μm as a substrate using the Baker type applicator, and was heated at 80° C. for 1 hour, and was further heated at 110° C. for 1 hour. As a result, a negative electrode active material layer having a thickness of 60 μm was formed.

Next, the laminate was pressurized (600 MPa, 1 minute) while being heated (120° C.) using a heat press machine. As a result, a negative electrode sheet for an all-solid state secondary battery having a laminate structure of negative electrode active material layer/SUS foil was prepared. The mass of the negative electrode active material layer was 18 mg per 1 cm² (excluding the SUS foil).

The solid electrolyte composition S-1 prepared as described above was applied to the negative electrode active material layer of the negative electrode sheet for an all-solid state secondary battery obtained as described above using the Baker type applicator, and was heated at 80° C. for 1 hour, and was further heated at 100° C. for 1 hour. As a result, a solid electrolyte layer having a thickness of 100 μm was formed.

This negative electrode layer-solid electrolyte layer laminate was punched in a circular shape having a diameter of 10 mm using a punching machine to prepare a negative electrode-solid electrolyte sheet was prepared (area: 0.8 cm²).

[Preparation of all-Solid State Secondary Battery]

<Preparation of all-Solid State Secondary Battery No. 119>

The positive electrode sheet was laminated on the negative electrode-solid electrolyte sheet prepared as described above such that the solid electrolyte layer and the positive electrode active material layer were in contact with each other. Further, the laminate was pressurized (450 MPa, 1 minute) while being heated (120° C.) using a heat press machine. This way, the laminate satisfying [the area of the positive electrode layer]<[the area of the negative electrode layer]≤[the area of the solid electrolyte layer] was obtained.

A current terminal was provided on the positive electrode current collector (Al) and the negative electrode current collector (SUS) of the laminate, a 1 cm×1 cm cellulose fiber sheet as a buffer layer was disposed on each of the outsides (the sides opposite to the active material layer side) of the positive electrode current collector (Al) and the negative electrode current collector (SUS), and the laminate was vacuum-packed using a laminate film. As a result, an all-solid state secondary battery No. 119 (FIG. 2) in which the laminate was in a pressurized state through the buffer layer was obtained.

<Preparation of all-Solid State Secondary Batteries No. 101 to 118, 123, 124 and No. c101 to c114>

Using the same method as that of the all-solid state secondary battery No. 119, all-solid state secondary batteries shown below in the table were prepared.

Here, regarding the all-solid state secondary batteries shown below in the table including the pressurizing plate, a laminate consisting of the positive electrode layer, the solid electrolyte layer, and the negative electrode layer was prepared, a current terminal was provided on the positive electrode current collector (Al) and the negative electrode current collector (SUS), the laminate was non-vacuum-packed using a laminate film, and the laminate in a substantially non-pressurized package state was prepared. Next, the buffer layer was disposed from the surface of the laminate film to cover the entire positive electrode layer and the entire negative electrode layer were covered, the pressurizing plate was disposed on the outside of each of the buffer layers to cover the entire buffer layer, and the laminate was sandwiched between the pressurizing plates using a vice such that pressure was applied to the laminate (FIG. 3). In addition, regarding the all-solid state secondary batteries where "*1" is shown in the column "Pressure" of the table below, the laminate was non-vacuum-packed using a laminate film as described above, and the laminate was sandwiched between the buffer layers using a vice without using the pressurizing plate such that pressure was applied to the laminate.

In addition, in No. 103 to 105, 107 to 109, 111 to 118, 120, 122 to 124, and c106 to c108, a nonconductor sheet having a thickness and a size as shown in the table was hollowed in the size of the positive electrode, and was disposed in a peripheral portion of the positive electrode. As a result, a nonconductor layer was provided on the outer periphery of the positive electrode layer (a nonconductor layer formed of a polystyrene resin was provided in the battery No. 103, and a nonconductor layer formed of a polyethylene resin was provided in the other batteries).

In addition, in the batteries No. c108 to c113, the laminate was pressurized using the pressurizing plate without providing the buffer layer.

The configurations of the respective batteries prepared as described above are collectively shown below in the table.

TABLE 1

| Battery No. | Positive Electrode Layer | | | Nonconductor Layer | | | Solid Electrolyte Layer | | | Negative Electrode Layer Area (cm²) |
|---|---|---|---|---|---|---|---|---|---|---|
| | Area (cm²) | Young's Modulus (GPa) | Thickness (μm) | Young's Modulus (GPa) | Thickness (μm) | Total Area of Positive Electrode Layer and Nonconductor Layer (cm²) | Area (cm²) | Young's Modulus (GPa) | Thickness (μm) | |
| 101 | 0.6 | 70 | 80 | | | 0.6 | 0.8 | 15 | 50 | 0.8 |
| 102 | 0.6 | 70 | 80 | | | 0.6 | 0.8 | 15 | 100 | 0.8 |
| 103 | 4 | 70 | 80 | 3 | 20 | 6 | 6.25 | 15 | 100 | 6.25 |
| 104 | 4 | 70 | 80 | 1 | 20 | 6.25 | 6.25 | 15 | 100 | 6.25 |
| 105 | 4 | 70 | 80 | 1 | 20 | 6.25 | 6.25 | 15 | 100 | 6.25 |
| 106 | 4 | 70 | 80 | | | 4 | 6.25 | 15 | 100 | 6.25 |
| 107 | 4 | 70 | 80 | 1 | 20 | 6.25 | 6.25 | 15 | 100 | 6.25 |
| 108 | 4 | 70 | 80 | 1 | 20 | 6.25 | 6.25 | 15 | 100 | 6.25 |
| 109 | 4 | 70 | 80 | 1 | 20 | 6.25 | 6.25 | 15 | 100 | 6.25 |
| 110 | 4 | 70 | 80 | | | 4 | 6.25 | 15 | 100 | 6.25 |
| 111 | 4 | 70 | 80 | 1 | 20 | 6.25 | 6.25 | 15 | 100 | 6.25 |
| 112 | 4 | 70 | 80 | 1 | 50 | 6.25 | 6.25 | 15 | 100 | 6.25 |
| 113 | 4 | 70 | 80 | 1 | 20 | 6.25 | 6.25 | 15 | 100 | 6.25 |
| 114 | 2 | 70 | 80 | 1 | 20 | 2.4 | 2.4 | 15 | 100 | 2.4 |
| 115 | 3 | 70 | 80 | 1 | 20 | 4 | 4 | 15 | 100 | 4 |
| 116 | 20 | 70 | 80 | 1 | 20 | 25 | 25 | 15 | 100 | 25 |
| 117 | 4 | 70 | 80 | 1 | 20 | 6.25 | 6.25 | 15 | 100 | 6.25 |
| 118 | 4 | 70 | 80 | 1 | 20 | 6.25 | 6.25 | 15 | 100 | 6.25 |
| 119 | 0.6 | 70 | 80 | | | 0.6 | 0.8 | 15 | 100 | 0.8 |
| 120 | 4 | 70 | 80 | 1 | 20 | 6.25 | 6.25 | 15 | 100 | 6.25 |
| 121 | 0.6 | 70 | 80 | | | 0.6 | 0.8 | 15 | 100 | 0.8 |
| 122 | 4 | 70 | 80 | 1 | 20 | 6.25 | 6.25 | 15 | 100 | 6.25 |
| 123 | 4 | 70 | 80 | 1 | 20 | 6.25 | 6.25 | 15 | 100 | 6.25 |
| 124 | 4 | 70 | 80 | 1 | 20 | 6.25 | 6.25 | 15 | 100 | 6.25 |

TABLE 1-continued

| | Negative Electrode Layer | | Buffer Layer | | | | | | Pressurizing Plate | |
|---|---|---|---|---|---|---|---|---|---|---|
| Battery No. | Young's Modulus (GPa) | Thickness (μm) | Kind | Area (cm²) | Young's Modulus (GPa) | Number of Layers Laminated | Thickness (mm) | Pressure (MPa) | Kind | Young's Modulus (GPa) |
| 101 | 120 | 80 | SiR | 1 | 0.2 | 1 | 1 | 10 | SUS | 200 |
| 102 | 120 | 80 | CFS | 1 | 0.1 | 1 | 1.3 | 10 | SUS | 200 |
| 103 | 120 | 80 | Thick Paper | 9 | 2 | 1 | 5 | 10 | SUS | 200 |
| 104 | 120 | 80 | PE | 9 | 1 | 1 | 0.5 | 10 | SUS | 200 |
| 105 | 120 | 80 | Foaming Urethane | 9 | 0.05 | 1 | 5 | 10 | SUS | 200 |
| 106 | 120 | 80 | SiR | 9 | 0.2 | 1 | 1 | 10 | SUS | 200 |
| 107 | 120 | 80 | CFS | 9 | 0.1 | 1 | 1.3 | 10 | SUS | 200 |
| 108 | 120 | 80 | CFS | 9 | 0.1 | 1 | 1.3 | 10 | SUS | 200 |
| 109 | 120 | 80 | SiR | 9 | 0.2 | 1 | 1 | 10 | SUS | 200 |
| 110 | 120 | 80 | CFS | 9 | 0.1 | 1 | 1.3 | 10 | Acr | 2 |
| 111 | 120 | 80 | CFS | 9 | 0.1 | 2 | 1.3 | 10 | Acr | 2 |
| 112 | 120 | 80 | CFS | 9 | 0.1 | 1 | 1.3 | 10 | Acr | 2 |
| 113 | 120 | 80 | PE | 9 | 1 | 1 | 0.02 | 10 | Acr | 2 |
| 114 | 120 | 80 | CFS | 4 | 0.1 | 1 | 1.3 | 10 | Acr | 2 |
| 115 | 120 | 80 | CFS | 9 | 0.1 | 1 | 1.3 | 10 | Acr | 2 |
| 116 | 120 | 80 | CFS | 50 | 0.1 | 1 | 1.3 | 10 | Acr | 2 |
| 117 | 120 | 80 | PMMA | 9 | 2 | 1 | 2 | 10 | Acr | 2 |
| 118 | 120 | 80 | PI | 9 | 5 | 1 | 0.1 | 10 | Acr | 2 |
| 119 | 120 | 80 | CFS | 1 | 0.1 | 1 | 1.3 | 0.1 | | |
| 120 | 120 | 80 | CFS | 9 | 0.1 | 1 | 1.3 | 0.1 | | |
| 121 | 120 | 80 | Acr | 9 | 2 | 1 | 15 | 10*¹ | | |
| 122 | 120 | 80 | Acr | 9 | 2 | 1 | 15 | 10*¹ | | |
| 123 | 120 | 80 | Foaming PE | 9 | 0.01 | 1 | 2 | 10 | Acr | 2 |
| 124 | 120 | 80 | Wood | 9 | 12 | 1 | 5 | 10 | Acr | 2 |

| | Positive Electrode Layer | | | Nonconductor Layer | | Total Area of Positive Electrode Layer and Nonconductor Layer (cm²) | Solid Electrolyte Layer | | | Negative Electrode Layer Area (cm²) |
|---|---|---|---|---|---|---|---|---|---|---|
| Battery No. | Area (cm²) | Young's Modulus (GPa) | Thickness (μm) | Young's Modulus (GPa) | Thickness (μm) | | Area (cm²) | Young's Modulus (GPa) | Thickness (μm) | |
| c101 | 0.8 | 70 | 80 | | | | 0.8 | 15 | 100 | 0.8 |
| c102 | 0.8 | 70 | 80 | | | | 0.8 | 15 | 100 | 0.8 |
| c103 | 0.8 | 70 | 80 | | | | 0.8 | 15 | 100 | 0.8 |
| c104 | 4 | 70 | 80 | | | | 4 | 15 | 100 | 4 |
| c105 | 4 | 70 | 80 | | | | 6.25 | 15 | 100 | 6.25 |
| c106 | 4 | 70 | 80 | 1 | 20 | 6.25 | 6.25 | 15 | 100 | 6.25 |
| c107 | 4 | 70 | 80 | 1 | 20 | 6.25 | 6.25 | 15 | 100 | 6.25 |
| c108 | 4 | 70 | 80 | 1 | 20 | 6.25 | 6.25 | 15 | 100 | 6.25 |
| c109 | 0.6 | 70 | 80 | | | | 0.8 | 15 | 100 | 0.8 |
| c110 | 2 | 70 | 80 | | | | 2.4 | 15 | 100 | 2.4 |
| c111 | 3 | 70 | 80 | | | | 4 | 15 | 100 | 4 |
| c112 | 4 | 70 | 80 | | | | 6.25 | 15 | 100 | 6.25 |
| c113 | 20 | 70 | 80 | | | | 25 | 15 | 100 | 25 |
| c114 | 20 | 70 | 80 | | | | 25 | 15 | 100 | 20 |

| | Negative Electrode Layer | | Buffer Layer | | | | | | Pressurizing Plate | |
|---|---|---|---|---|---|---|---|---|---|---|
| Battery No. | Young's Modulus (GPa) | Thickness (μm) | Kind | Area (cm²) | Young's Modulus (GPa) | Number of Layers Laminated | Thickness (mm) | Pressure (MPa) | Kind | Young's Modulus (GPa) |
| c101 | 120 | 80 | Ti (Non-Buffer Layer) | 1 | 120 | 1 | 0.1 | 10 | Acr | 2 |
| c102 | 120 | 80 | Acr | 0.8 | 2 | 1 | 15 | 10*¹ | | |
| c103 | 120 | 80 | Si Rubber | 1 | 0.2 | 1 | 1 | 10 | Acr | 2 |
| c104 | 120 | 80 | Si Rubber | 9 | 0.2 | 1 | 1 | 10 | SUS | 200 |
| c105 | 120 | 80 | Ti (Non-Buffer Layer) | 9 | 120 | 1 | 0.1 | 10 | Acr | 2 |
| c106 | 120 | 80 | Ti (Non-Buffer Layer) | 9 | 80 | 1 | 0.1 | 10 | Acr | 2 |
| c107 | 120 | 80 | Ti (Non-Buffer Layer) | 9 | 200 | 1 | 1.5 | 10 | Acr | 2 |

TABLE 1-continued

| c108 | 120 | 80 |     |    |   |    | 0.1  |     |     |
|------|-----|----|-----|----|---|----|------|-----|-----|
| c109 | 120 | 80 |     |    |   |    | 10   | SUS | 200 |
| c110 | 120 | 80 |     |    |   |    | 10   | SUS | 200 |
| c111 | 120 | 80 |     |    |   |    | 10   | SUS | 200 |
| c112 | 120 | 80 |     |    |   |    | 10   | SUS | 200 |
| c113 | 120 | 80 |     |    |   |    | 10   | SUS | 200 |
| c114 | 120 | 80 | Acr | 30 | 2 | 15 | 10*1 |     |     |

The terms in the table will be described.

SiR: silicon rubber (trade name: silicon rubber sheet 1t, manufactured by AS ONE Corporation)
CFS: cellulose fiber sheet (trade name: PACOPADS, manufactured by PACOTHANE TECHNOLOGIES)
Thick paper (trade name: CARTONNAGE thick paper)
PE: polyethylene (trade name: polyethylene film soft sheet (available from Tech-Jam))
Foaming urethane (trade name: low resilience urethane sheet, manufactured by Misumi Group Inc.)
PMMA: polymethyl methacrylate (trade name: PMMA-101005 and the like, manufactured by AS ONE Corporation)
PI: polyimide (trade name: KAPTON, manufactured by Du Pont-Toray Co., Ltd.)
Acr: an acrylic plate (trade name: acrylic plate, manufactured by Misumi Group Inc.)
Foaming PE: foaming polyethylene (trade name: foaming polyethylene sheet, manufactured by Misumi Group Inc.)
Wood (trade name: Balsa plate)
Silver foil (trade name: silver foil, manufactured by The Nilaco Corporation)
Iron plate (trade name: steel plate, manufactured by Misumi Group Inc.)

Test Example

Regarding the all-solid state secondary batteries prepared as described above, cycle characteristics, discharge load characteristics, and high-speed charging characteristics were evaluated.

<Cycle Characteristics>

Using each of the all-solid state secondary batteries prepared as described above, a charging and discharging cycle of 4.2 V to 3.0 V was repeated four times in an environment of 25° C. at a charge current value of 0.5 mA/cm$^2$ and a discharge current value of 0.5 mA/cm$^2$.

Next, a charging and discharging cycle of 4.2 V to 3.0 V was repeated in an environment of 30° C. at a charge current value of 2.5 mA/cm$^2$ and a discharge current value of 2.5 mA/cm$^2$.

The discharge capacity in the first cycle and the discharge capacity in the 100-th cycle were measured, and a discharge capacity retention ratio calculated from the following expression was evaluated based on the following evaluation standards.

Discharge Capacity Retention Ratio (%)=100×[Discharge Capacity in 100-th Cycle]/[Discharge Capacity in First Cycle]

—Evaluation Standards of Cycle Characteristics—

A: the discharge capacity retention ratio was 71% or higher
B: the discharge capacity retention ratio was 51% to 70%
C: the discharge capacity retention ratio was 31% to 50%
D: the discharge capacity retention ratio was 11% to 30%
E: battery abnormality occurred before 100 cycles, or the discharge capacity retention ratio was 0% to 10%

"Battery abnormality" refers to a phenomenon in which a decrease in battery voltage of 0.05 V/sec or higher was observed during charging in a range where the battery voltage was between 3.5 V and 4.2 V during charging, or a phenomenon in which the open-circuit voltage after completion of discharging was 2 V or lower.

<Discharge Load Characteristics>

Using each of the all-solid state secondary batteries prepared as described above, a charging and discharging cycle of 4.2 V to 3.0 V was repeated four times in an environment of 25° C. at a charge current value of 0.5 mA/cm$^2$ and a discharge current value of 0.5 mA/cm$^2$.

Next, in an environment of 25° C., the battery was charged to 4.2 V at a charge current value of 0.8 mA/cm$^2$ and was discharged to 3.0 V at a discharge current value of 0.8 mA/cm$^2$. Next, the battery was further charged to 4.2 V at a charge current value of 0.8 mA/cm$^2$ and was discharged to 3.0 V at a discharge current value of 8 mA/cm$^2$.

A discharge capacity (a1) at a discharge current value of 0.8 mA/cm$^2$ and a discharge capacity (a2) at a discharge current value of 8 mA/cm$^2$ were measured, and a discharge capacity retention ratio calculated from the following expression was evaluated based on the following evaluation standards.

Discharge Capacity Retention Ratio (%)=100×a2/a1

—Evaluation Standards of Discharge Load Characteristics—

A: the discharge capacity retention ratio was 71% or higher
B: the discharge capacity retention ratio was 51% to 70%
C: the discharge capacity retention ratio was 31% to 50%
D: the discharge capacity retention ratio was 11% to 30%
E: battery abnormality occurred during the evaluation, or the discharge capacity retention ratio was 0% to 10%

"Battery abnormality" refers to a phenomenon in which a decrease in battery voltage of 0.05 V/sec or higher was observed during charging in a range where the battery voltage was between 3.5 V and 4.2 V during charging, or a phenomenon in which the open-circuit voltage after completion of discharging was 2 V or lower.

As the discharge capacity retention ratio is higher, discharge at a high discharge current value can be efficiently performed at a low resistance.

<High-Speed Charging Characteristics>

Using each of the all-solid state secondary batteries prepared as described above, a charging and discharging cycle of 4.2 V to 3.0 V was repeated four times in an environment of 25° C. at a charge current value of 0.5 mA/cm$^2$ and a discharge current value of 0.5 mA/cm$^2$.

Next, in an environment of 25° C., the battery was charged to 4.2 V at a charge current value of 0.8 mA/cm$^2$ and was discharged to 3.0 V at a discharge current value of 0.8 mA/cm$^2$. Next, the battery was further charged to 4.2 V at a charge current value of 8 mA/cm$^2$ and was charged at a constant voltage of 4.2 V until the current value reached 0.8 mA/cm². Next, the battery was discharged to 3.0 V at a discharge current value of 0.8 mA/cm².

A charge capacity (b1) at a charge current value of 0.8 mA/cm² and a charge capacity (b2) at a charge current value of 8 mA/cm² were measured. A charge capacity retention ratio calculated from the following expression was evaluated based on the following evaluation standards.

Charge Capacity Retention Ratio (%)=100×b2/b1

—Evaluation Standards of High-Speed Charging Characteristics—
  A: the charge capacity retention ratio was 71% or higher
  B: the charge capacity retention ratio was 51% to 70%
  C: the charge capacity retention ratio was 31% to 50%
  D: the charge capacity retention ratio was 11% to 30%
  E: battery abnormality occurred during the evaluation, or the charge capacity retention ratio was 0% to 10% the evaluation of cycle characteristics was higher than that of the reference battery by two levels based on the evaluation standards was evaluated as B, a case where the evaluation of cycle characteristics was higher than that of the reference battery by one level based on the evaluation standards was evaluated as C, a case where the evaluation of cycle characteristics was the same as that of the reference battery based on the evaluation standards was evaluated as D, and a case where the evaluation of cycle characteristics was the lower than that of the reference battery based on the evaluation standards was evaluated as E. As the reference battery, among No. c109 to 113, the battery having the same area of the positive electrode layer was used. For example, the reference battery for the battery No. 101 is the battery No. c109, and the reference battery for the battery No. 103 is the battery No. c112.

TABLE 2

| Battery No. | Positive Electrode Layer | Solid Electrolyte Layer | Negative Electrode Layer | Cycle Characteristics | Discharge Load Characteristics | High-Speed Charging Characteristics | Performance Improvement Ratio |
|---|---|---|---|---|---|---|---|
| 101 | AS-1 | S-1 | BS-1 | B | A | B | C |
| 102 | AS-1 | S-1 | BS-1 | B | A | B | C |
| 103 | AS-1 | S-1 | BS-1 | B | B | B | B |
| 104 | AS-1 | S-1 | BS-1 | A | A | A | A |
| 105 | AS-1 | S-1 | BS-1 | A | A | A | A |
| 106 | AS-1 | S-1 | BS-1 | B | A | A | B |
| 107 | AS-1 | S-1 | BS-1 | A | A | A | A |
| 108 | AS-2 | S-2 | BS-2 | A | A | A | A |
| 109 | AS-1 | S-1 | BS-1 | A | B | B | A |
| 110 | AS-1 | S-1 | BS-1 | A | B | A | A |
| 111 | AS-1 | S-1 | BS-1 | A | B | B | A |
| 112 | AS-1 | S-1 | BS-1 | A | B | A | A |
| 113 | AS-1 | S-1 | BS-1 | B | C | B | B |
| 114 | AS-1 | S-1 | BS-1 | B | A | B | C |
| 115 | AS-1 | S-1 | BS-1 | B | A | A | C |
| 116 | AS-1 | S-1 | BS-1 | A | B | A | A |
| 117 | AS-1 | S-1 | BS-1 | B | B | B | B |
| 118 | AS-1 | S-1 | BS-1 | B | B | B | B |
| 119 | AS-1 | S-1 | BS-1 | B | C | C | C |
| 120 | AS-1 | S-1 | BS-1 | B | B | B | B |
| 121 | AS-1 | S-1 | BS-1 | B | B | C | C |
| 122 | AS-1 | S-1 | BS-1 | C | C | C | C |
| 123 | AS-1 | S-1 | BS-1 | C | C | C | C |
| 124 | AS-1 | S-1 | BS-1 | C | C | C | C |
| c101 | AS-1 | S-1 | BS-1 | D | E | E | |
| c102 | AS-1 | S-1 | BS-1 | D | E | E | |
| c103 | AS-1 | S-1 | BS-1 | C | C | E | |
| c104 | AS-1 | S-1 | BS-1 | B | B | E | |
| c105 | AS-1 | S-1 | BS-1 | D | E | D | D |
| c106 | AS-1 | S-1 | BS-1 | D | E | D | D |
| c107 | AS-1 | S-1 | BS-1 | D | E | D | D |
| c108 | AS-1 | S-1 | BS-1 | D | E | D | D |
| c109 | AS-1 | S-1 | BS-1 | C | D | D | Reference |
| c110 | AS-1 | S-1 | BS-1 | C | D | E | Reference |
| c111 | AS-1 | S-1 | BS-1 | C | E | D | Reference |
| c112 | AS-1 | S-1 | BS-1 | D | E | E | Reference |
| c113 | AS-1 | S-1 | BS-1 | D | E | E | Reference |
| c114 | AS-1 | S-1 | BS-1 | B | B | E | B |

"Battery abnormality" refers to a phenomenon in which a decrease in battery voltage of 0.05 V/sec or higher was observed during charging in a range where the battery voltage was between 3.5 V and 4.2 V during charging, or a phenomenon in which the open-circuit voltage after completion of discharging was 2 V or lower.

The results are shown in the table below.

For "Performance Improvement Ratio" in the table below, a case where the evaluation of cycle characteristics was higher than that of a reference battery by three levels based on the evaluation standards was evaluated as A, a case where As shown in the table above, in a case where the laminate forming the all-solid state secondary battery did not satisfy [the area of the positive electrode layer]<[the area of the solid electrolyte layer], at least either cycle characteristics, discharge load characteristics, or high-speed charging characteristics were poor irrespective of whether or not the buffer layer was provided (No. c101 to c104). In addition, although not shown in the table, during the manufacturing of the batteries No. c101 to c104, about 70% were defective products where short-circuit occurred in the battery. During the manufacturing of the battery No. c114, about 20% were defective products where short-circuit occurred in the battery. In this case, the manufacturing suitability was poor.

In addition, in a case where the laminate satisfied the relationship defined by the present invention: [the area of the positive electrode layer]<[the area of the negative electrode layer]≤[the area of the solid electrolyte layer] and was not pressurized through the buffer layer, at least either cycle characteristics, discharge load characteristics, or high-speed charging characteristics were poor (No. c105 to c113).

In addition, in a case where the laminate satisfied [the area of the positive electrode layer]<[the area of the solid electrolyte layer] but did not satisfy [the area of the negative electrode layer]≤[the area of the solid electrolyte layer], high-speed charging characteristics were poor (No. c114).

On the other hand, in the all-solid state secondary batteries satisfying the requirements defined by the present invention, all of cycle characteristics, discharge load characteristics, and high-speed charging characteristics were excellent (No. 101 to 124).

Further, it can be seen from the result of the performance improvement ratio that, in a case where the Young's modulus of the buffer layer was in the predetermined range and the area of the positive electrode layer was 4 cm² or more, the improvement of cycle characteristics was large. The reason for this is presumed that the buffer layer effectively suppressed a large in-plane variation in pressure (a portion on which pressure concentrates is likely to be generated or a portion where pressure is sufficient is likely to be generated) caused in a case where the area of the positive electrode layer was more than a given value. That is, it is presumed that, by providing the buffer layer defined by the present invention for pressurization, a layer that is formed of solid particles and is not likely be uniformly pressurized on a micro level (this layer is also a layer that repeatedly expands and contracts due to charging and discharging) can be uniformly pressurized on a micro level.

The present invention has been described using the embodiments. However, unless specified otherwise, any of the details of the above description is not intended to limit the present invention and can be construed in a broad sense within a range not departing from the concept and scope of the present invention disclosed in the accompanying claims.

EXPLANATION OF REFERENCES

1: negative electrode current collector
2: negative electrode active material layer
3: solid electrolyte layer
4: positive electrode active material layer
5: positive electrode current collector
6: operation portion
10: laminate
11, 11a, 11b: buffer layer
12: positive electrode layer (positive electrode current collector and positive electrode active material layer)
13: solid electrolyte layer
14: negative electrode layer (negative electrode current collector and negative electrode active material layer)
15, 15a, 15b: pressurizing plate

What is claimed is:
1. An all-solid state secondary battery comprising a laminate in which a positive electrode layer, a solid electrolyte layer, and a negative electrode layer are laminated in this order,
wherein respective areas of the positive electrode layer, the solid electrolyte layer, and the negative electrode layer satisfy [the area of the positive electrode layer]<[the area of the negative electrode layer]≤[the area of the solid electrolyte layer],
a buffer layer having an area more than the area of the solid electrolyte layer and having a Young's modulus lower than that of each of, the positive electrode layer, the solid electrolyte layer, and the negative electrode layer is provided on both of a side of the positive electrode layer opposite to the solid electrolyte layer side and a side of the negative electrode layer opposite to the solid electrolyte layer side, and
the laminate is in a pressurized state through the buffer layer;
wherein the pressurized state is a state the laminate is pressurized by a pressurizing plate,
wherein a nonconductor layer is provided on an outer peripheral portion of the positive electrode layer,
the thickness of the buffer layer is more than a total thickness of the positive electrode layer, the solid electrolyte layer, and the negative electrode layer, and
the Young's modulus of the buffer layer is 0.01 GPa or higher and lower than 2 GPa.

2. The all-solid state secondary battery according to claim 1, the nonconductor layer is a layer having an electron conductivity of $10^{-5}$ S/cm or lower at a measurement temperature of 25° C., a total area of the positive electrode layer and the nonconductor layer is more than or equal to the area of the negative electrode layer, and the buffer layer has a Young's modulus lower than that of the nonconductor layer.

3. The all-solid state secondary battery according to claim 2,
wherein respective thicknesses of the nonconductor layer, the positive electrode layer, and the buffer layer satisfy [the thickness of the nonconductor layer]≤[the thickness of the positive electrode layer]≤[the thickness of the buffer layer].

4. The all-solid state secondary battery according to claim 1,
wherein the area of the positive electrode layer is 4 cm2 or more.

5. The all-solid state secondary battery according to claim 1, further comprising:
the pressurizing plate that is provided on a side of the buffer layer opposite to the laminate side.

6. The all-solid state secondary battery according to claim 1,
wherein at least one of the positive electrode layer, the solid electrolyte layer, or the negative electrode layer includes an organic polymer compound.

7. The all-solid state secondary battery according to claim 1,
wherein a solid electrolyte is a sulfide-based solid electrolyte.

8. The all-solid state secondary battery according to claim 1,
wherein a pressure in the pressurized state is 0.1 MPa to 60 MPa.

9. A method of manufacturing an all-solid state secondary battery including a laminate in which a positive electrode layer, a solid electrolyte layer, and a negative electrode layer are laminated in this order, the method comprising:
setting respective areas of the positive electrode layer, the solid electrolyte layer, and the negative electrode layer such that [the area of the positive electrode layer]<[the area of the negative electrode layer]≤[the area of the solid electrolyte layer] is satisfied;

disposing a buffer layer having an area more than the area of the solid electrolyte layer and having a Young's modulus lower than that of each of the positive electrode layer, the solid electrolyte layer, and the negative electrode layer on both of a side of the positive electrode layer opposite to the solid electrolyte layer side and a side of the negative electrode layer opposite to the solid electrolyte layer side; and pressurizing the laminate through the buffer layer;

wherein the pressurized state is a state the laminate is pressurized by a pressurizing plate, wherein a nonconductor layer is provided on an outer peripheral portion of the positive electrode layer, wherein the thickness of the buffer layer is more than a total thickness of the positive electrode layer, the solid electrolyte layer, and the negative electrode layer, and the Young's modulus of the buffer layer is 0.01 GPa or higher and lower than 2 GPa.

\* \* \* \* \*